(12) United States Patent
Mitobe et al.

(10) Patent No.: US 10,816,848 B2
(45) Date of Patent: Oct. 27, 2020

(54) POLARIZING PLATE, AND METHOD FOR MANUFACTURING POLARIZING PLATE INCLUDING BONDING OPTICAL ROTARY LAYER TO POLARIZER AND ADJUSTING STORAGE ELASTIC MODULUS OF BONDING LAYER

(71) Applicant: FUJIFILM Corporation, Tokyo (JP)

(72) Inventors: Fumitake Mitobe, Kanagawa (JP); Jun Takeda, Kanagawa (JP); Yasukazu Kuwayama, Kanagawa (JP); Yuya Hamaguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 99 days.

(21) Appl. No.: 16/170,746

(22) Filed: Oct. 25, 2018

(65) Prior Publication Data

US 2019/0064587 A1 Feb. 28, 2019

Related U.S. Application Data

(63) Continuation of application No. PCT/JP2017/016906, filed on Apr. 28, 2017.

(30) Foreign Application Priority Data

Apr. 28, 2016 (JP) .................. 2016-091105

(51) Int. Cl.
*G02F 1/1335* (2006.01)
*G02F 1/13363* (2006.01)
*G02B 5/30* (2006.01)

(52) U.S. Cl.
CPC ......... *G02F 1/133528* (2013.01); *G02B 5/30* (2013.01); *G02F 1/133504* (2013.01);
(Continued)

(58) Field of Classification Search
CPC ......... G02F 1/133528; G02F 1/133636; G02F 1/133536; G02F 1/133504; G02F 2413/01;
(Continued)

(56) References Cited

U.S. PATENT DOCUMENTS 6,169,708 B1   1/2001  Kaneko et al.
6,661,488 B1 * 12/2003  Takeda ............. G02F 1/133707
                                                            349/117

(Continued)

FOREIGN PATENT DOCUMENTS

JP    2000-029017 A    1/2000
JP    2005-037530 A    2/2005
(Continued)

OTHER PUBLICATIONS

International Search Report issued in PCT/JP2017/016906 dated Aug. 1, 2017.
(Continued)

*Primary Examiner* — Huyen L Ngo
(74) *Attorney, Agent, or Firm* — Edwards Neils LLC; Jean C. Edwards, Esq.

(57) ABSTRACT

A method for manufacturing a polarizing plate having excellent appearance properties and including a polarizer, an optical rotatory layer, and a brightness enhancement film, a polarizing plate, and a liquid crystal display device including the polarizing plate, are described. The method includes forming an optical rotatory layer, which has a film thickness of 1 to 10 μm and rotates a polarization axis of linearly polarized light, on a temporary support to manufacture a temporary support with an optical rotatory layer; bonding the optical rotatory layer of the temporary support with an optical rotatory layer and polarizer through a curable adhesive layer, and curing the curable adhesive layer to form a
(Continued)

first bonding layer having a storage elastic modulus of 2 to 1500 MPa; peeling off the temporary support from the laminate; and bonding the optical rotary layer of the laminate and a brightness enhancement film through a second bonding layer.

15 Claims, 3 Drawing Sheets

(52) U.S. Cl.
CPC .. *G02F 1/133536* (2013.01); *G02F 1/133636* (2013.01); *G02F 2001/133507* (2013.01); *G02F 2001/133531* (2013.01); *G02F 2202/28* (2013.01); *G02F 2413/01* (2013.01)

(58) Field of Classification Search
CPC ..... G02F 2202/28; G02F 2001/133531; G02F 2001/133507; G02B 5/30; G02B 5/3016
See application file for complete search history.

(56) References Cited

U.S. PATENT DOCUMENTS

| | | | | |
|---|---|---|---|---|
| 2003/0089956 A1* | 5/2003 | Allen | ................... | G02B 27/281 257/432 |
| 2005/0088740 A1 | 4/2005 | Takeda et al. | | |
| 2005/0243245 A1* | 11/2005 | Taguchi | ................. | G02B 5/305 349/96 |
| 2006/0170851 A1* | 8/2006 | Kawamoto | .......... | G02B 5/3083 349/123 |
| 2007/0267133 A1 | 11/2007 | Matano et al. | | |
| 2009/0251642 A1* | 10/2009 | Nakamura | ............ | B32B 27/308 349/75 |
| 2011/0194052 A1* | 8/2011 | Hiratsuka | ............ | G02B 5/3033 349/96 |
| 2011/0310319 A1* | 12/2011 | Mizusaki | ............. | G02B 5/3083 349/33 |
| 2014/0284582 A1* | 9/2014 | Saitoh | ............... | G02F 1/133528 257/40 |
| 2015/0042927 A1* | 2/2015 | Kim | ..................... | G02F 1/13363 349/96 |
| 2015/0219812 A1* | 8/2015 | Kobayashi | .......... | B32B 37/1284 349/194 |
| 2015/0338694 A1* | 11/2015 | Hamamoto | ........... | G02F 1/1337 349/61 |
| 2016/0209552 A1* | 7/2016 | Satake | ....................... | B32B 7/02 |
| 2016/0244642 A1* | 8/2016 | Edmonds | ............... | C09J 133/06 |
| 2016/0291224 A1* | 10/2016 | Ahn | ..................... | G02B 5/3083 |
| 2017/0357112 A1* | 12/2017 | Shibahara | ......... | G02F 1/133528 |

FOREIGN PATENT DOCUMENTS

| | | |
|---|---|---|
| JP | 2005-504341 A | 2/2005 |
| JP | 2005-128216 A | 5/2005 |
| JP | 2007-332341 A | 12/2007 |
| JP | 2008-225225 A | 9/2008 |
| JP | 2011112952 | 6/2011 |
| JP | 2014-182283 A | 9/2014 |
| WO | 9945427 A1 | 10/1999 |

OTHER PUBLICATIONS

Written Opinion issued in PCT/JP2017/016906 dated Aug. 1, 2017.
International Preliminary Report on Patentability completed by WIPO dated Oct. 30, 2018 in connection with International Patent Application No. PCT/JP2017/016906.
Office Action, issued by the Japanese Patent Office dated Oct. 29, 2019, in connection with Japanese Patent Application No. 2018-514732.

* cited by examiner

POLARIZING PLATE, AND METHOD FOR MANUFACTURING POLARIZING PLATE INCLUDING BONDING OPTICAL ROTARY LAYER TO POLARIZER AND ADJUSTING STORAGE ELASTIC MODULUS OF BONDING LAYER

CROSS-REFERENCE TO RELATED APPLICATIONS

This application is a Continuation of PCT International Application No. PCT/JP2017/016906 filed on Apr. 28, 2017, which was published under PCT Article 21(2) in Japanese, and which claims priority under 35 U.S.C. § 119(a) to Japanese Patent Application No. 2016-091105 filed on Apr. 28, 2016. The above applications are hereby expressly incorporated by reference, in their entirety, into the present application.

BACKGROUND OF THE INVENTION

Field of the Invention

The present invention relates to a polarizing plate, a method for manufacturing a polarizing plate, and a liquid crystal display device.

Description of the Related Art

In liquid crystal display devices, it has been proposed to arrange a so-called brightness enhancement film between a backlight and a backlight-side polarizer in order to save power consumption of the backlight.

Generally, a brightness enhancement film such as a dual brightness enhancement film (DBEF) (registered trademark) has a transmission axis parallel to a roll transport direction due to the manufacturing method thereof. On the other hand, a normal polarizer has an absorption axis a parallel to the roll transport direction.

Therefore, in a case where the brightness enhancement film described above and a polarizer are bonded, it is necessary that one of the brightness enhancement film and the polarizer is punched and then is rotated by 90° to bond the brightness enhancement film and the polarizer, which causes deterioration in productivity.

As a method for solving the above problem, JP2005-504341A proposes a method for arranging a polarization rotator element (so-called optical rotatory layer) that rotates the polarization axis of linearly polarized light between a reflective polarizer corresponding to a brightness enhancement film and a polarizer.

SUMMARY OF THE INVENTION

On the other hand, in recent years, in order to reduce the thickness of each device, it is desired to manufacture each member by a transfer method.

Therefore, the present inventors have found that in a case of trying to manufacture a polarizing plate including a polarizer, an optical rotatory layer, and a brightness enhancement film by a transfer method, there is the following problem.

More specifically, the present inventors have attempted to prepare a polarizing plate by the following procedure. First, an optical rotatory layer is formed on a temporary support, the optical rotatory layer of the obtained temporary support with an optical rotatory layer and a polarizer are bonded using a bonding layer, and then the temporary support is peeled off. Thereafter, the optical rotatory layer of the obtained laminate including the polarizer and the optical rotatory layer and a brightness enhancement film are bonded using a bonding layer, and a polarizing plate including the polarizer, the optical rotatory layer, and the brightness enhancement film in this order is prepared.

In a case where the polarizing plate is prepared in the above procedure, after the brightness enhancement film is bonded on the optical rotatory layer, there arises a problem that the appearance properties of the obtained polarizing plate are deteriorated.

In view of the above circumstances, an object of the present invention to provide a method for manufacturing a polarizing plate capable of easily manufacturing a polarizing plate having excellent appearance properties and including a polarizer, an optical rotatory layer, and a brightness enhancement film.

In addition, another object of the present invention is to provide a polarizing plate having excellent appearance properties and including a polarizer, an optical rotatory layer, and a brightness enhancement film, and a liquid crystal display device including the polarizing plate.

As a result of intensive investigations on the problem of the related art, the present inventors have found that the objects can be achieved by adjusting the storage elastic modulus of the bonding layer to be arranged between the polarizer and the optical rotatory layer.

That is, the objects can be achieved by adopting the following constitutions.

(1) A method for manufacturing a polarizing plate comprising:

Step 1 of forming an optical rotatory layer, which has a film thickness of 10 µm or less and rotates a polarization axis of linearly polarized light, on a temporary support to manufacture a temporary support with an optical rotatory layer;

Step 2 of bonding the optical rotatory layer of the temporary support with an optical rotatory layer and a polarizer through a curable adhesive layer and then curing the curable adhesive layer to form a first bonding layer having a storage elastic modulus of 2 to 1500 MPa;

Step 3 of peeling off the temporary support from a laminate obtained in Step 2; and Step 4 of bonding the optical rotatory layer of the laminate obtained in Step 3 and a brightness enhancement film through a second bonding layer.

(2) The method for manufacturing a polarizing plate according to (1), in which the second bonding layer has a storage elastic modulus of 1 MPa or less.

(3) The method for manufacturing a polarizing plate according to (1) or (2), in which the optical rotatory layer includes a liquid crystal compound which is aligned in a twisted manner along a helical axis extending in a thickness direction thereof, a twisted angle of the liquid crystal compound is 85° to 95°, and a product $\Delta nd$ of a refractive index anisotropy $\Delta n$ of the optical rotatory layer measured at a wavelength of 550 nm and a film thickness d of the optical rotatory layer is 450 to 550 nm.

(4) The method for manufacturing a polarizing plate according to any one of (1) to (3), in which a haze of the second bonding layer is 30% to 80%.

(5) The method for manufacturing a polarizing plate according to any one of (1) to (4), in which a product of a film thickness and a tensile elastic modulus of the brightness enhancement film is 560 or more, a unit of the film thickness is μm, and a unit of the tensile elastic modulus is GPa.

(6) A polarizing plate comprising, in order: a polarizer; a first bonding layer; an optical rotatory layer which rotates a polarization axis of linearly polarized light; a second bonding layer; and a brightness enhancement film, in which a film thickness of the optical rotatory layer is 10 μm or less, and the first bonding layer has a storage elastic modulus of 2 to 1500 MPa.

(7) The polarizing plate according to (6), in which the second bonding layer has a storage elastic modulus of 1 MPa or less.

(8) The polarizing plate according to (6) or (7), in which the optical rotatory layer includes a liquid crystal compound which is aligned in a twisted manner along a helical axis extending in a thickness direction thereof, a twisted angle of the liquid crystal compound is 85° to 95°, and a product Δnd of a refractive index anisotropy Δn of the optical rotatory layer measured at a wavelength of 550 nm and a film thickness d of the optical rotatory layer is 450 to 550 nm.

(9) The polarizing plate according to any one of (6) to (8), in which a haze of the second bonding layer is 30% to 80%.

(10) The polarizing plate according to any one of (6) to (9), in which a product of a film thickness and a tensile elastic modulus of the brightness enhancement film is 560 or more, a unit of the film thickness is μm, and a unit of the tensile elastic modulus is GPa.

(11) A liquid crystal display device comprising: a backlight; the polarizing plate according to any one of (6) to (10); a liquid crystal cell; and a front-side polarizer.

According to the present invention, it is possible to provide a method for manufacturing a polarizing plate capable of easily manufacturing a polarizing plate having excellent appearance properties and including a polarizer, an optical rotatory layer, and a brightness enhancement film.

In addition, according to the present invention, it is also possible to provide a polarizing plate having excellent appearance properties and including a polarizer, an optical rotatory layer, and a brightness enhancement film, and a liquid crystal display device including the polarizing plate.

DESCRIPTION OF THE PREFERRED EMBODIMENTS

Hereinafter, a method for manufacturing a polarizing plate, a polarizing plate, and a liquid crystal display device including the polarizing plate according to the present invention will be described in detail based on suitable embodiments shown in the accompanying drawings.

A numerical range denoted by using "to" in the present specification indicates a range including numerical values described before and after "to" as the lower limit value and the upper limit value.

In addition, a refractive index anisotropy Δn of an optical rotatory layer, and a twisted angle of a liquid crystal compound are obtained using AxoScan OPMF-1 (manufactured by Opto Science, Inc.) and the device attached analysis software.

In addition, in the present specification, an angular relationship (for example, "orthogonal", "parallel", and the like), includes an error range which is allowable in the technical field belonging to the present invention. At this time, for example, the allowable error range means a range of an exact angle±less than 10° and specifically, an error from the exact angle is preferably 5° or less and more preferably 3° or less.

One of features of a method for manufacturing a polarizing plate according to an embodiment of the present invention is to adjust the storage elastic modulus of a bonding layer to be arranged between an optical rotatory layer and a polarizer to be in a predetermined range.

The present inventors have found that in a case where a polarizing plate including a polarizer, an optical rotatory layer, and a brightness enhancement film is manufactured by transfer method including a predetermined procedure, when a laminate including a polarizer and an optical rotatory layer, and a brightness enhancement film is bonded, a problem arises. More specifically, for example, in a case where a laminate in which a polarizer and an optical rotatory layer are bonded with a first bonding layer having a low storage elastic modulus, and a brightness enhancement film are bonded through another second bonding layer, due to low rigidity of the optical rotatory layer and the first bonding layer, wrinkles and unevenness, and the like are easily formed in the obtained polarizing plate and bubbles easily enter the polarizing plate. As a result, the appearance properties of the obtained polarizing plate are deteriorated.

Therefore, regarding the above problems, the present inventors have found that the above problems arising when the brightness enhancement film is bonded are prevented from arising by increasing the storage elastic modulus of the first bonding layer to be arranged between the polarizer and the optical rotatory layer to a predetermined range.

The method for manufacturing a polarizing plate at least includes Steps 1 to 4 to be described later.

Hereinafter, the procedure of Steps 1 to 4 will be described in detail.

<Step 1>

Figure 1:
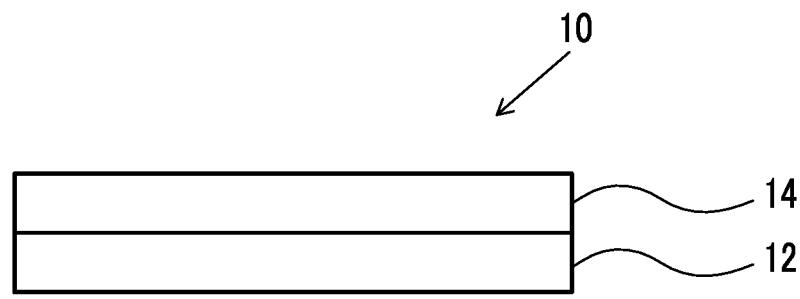
FIG. 1 is a schematic view showing an aspect of Step 1.

Step 1 is a step of forming an optical rotatory layer which has a film thickness of 10 μm or less and rotates a polarization axis of linearly polarized light on a temporary support to manufacture a temporary support with an optical rotatory layer. More specifically, by performing this step, as shown in FIG. 1, a temporary support with an optical rotatory layer 10 including a temporary support 12 and an optical rotatory layer 14 arranged on the temporary support is manufactured.

In the following, first, each member used in the step will be described in detail and then the procedure of the steps will be described in detail.

(Temporary Support)

The temporary support (also referred to as a peelable support) is a base material for support the optical rotatory layer to be described later and is closely attached to an optical rotatory layer surface to be peelable.

The surface of the temporary support exhibits easy peelability. The term "easy peelability" means a property of peeling at the interface between the temporary support and the optical rotatory layer in a case where an external force is applied to the laminated including the temporary support for peeling at the interface between the temporary support and the optical rotatory layer.

Examples of the temporary support include a support whose surface is treated with a release agent (for example, silicone-based release agent), and a support having peelability in itself.

Examples of materials constituting the temporary support include a cellulose-based polymer, a (meth)acrylic polymer, a thermoplastic norbornene-based polymer, a polycarbonate-based polymer, a polyester-based polymer, a styrene-based polymer, a polyolefin-based polymer, a amide-based polymer, an imide-based polymer, a sulfone-based polymer, a polyether sulfone-based polymer, a polyether ether ketone-based polymer, a polyphenylene sulfide-based polymer, a vinylidene chloride-based polymer, a polyoxymethylene-based polymer, an epoxy-based polymer, and a polymer obtained by mixing these polymers.

The thickness of the temporary support is not limited but from the viewpoint of excellent handleability of the temporary support with an optical rotatory layer, the thickness is preferably 15 to 500 µm and more preferably 50 to 250 µm.

(Optical Rotatory Layer)

The optical rotatory layer is a layer for rotating the polarization axis of linearly polarized light.

The film thickness of the optical rotatory layer is 10 µm or less, and is preferably 5 µm or less from the viewpoint of thickness reduction of a polarizing plate. The lower limit is not particularly limited but is 1 µm or more in many cases.

Although the material constituting the optical rotatory layer is not particularly limited, from the viewpoint of easy manufacturing, a liquid crystal compound is preferable. More specifically, it is preferable that the optical rotatory layer includes a liquid crystal compound which is aligned in a twisted manner along a helical axis extending in a thickness direction thereof (twisted aligned liquid crystal compound with a helical axis in thickness direction).

The twisted alignment of the liquid crystal compound means that by using the thickness direction of the optical rotatory layer as an axis (helical axis), the liquid crystal compound is twisted from one surface to the other surface. Along with this, the alignment direction (in-plane slow axis direction) of the liquid crystal compound varies depending on the position in the thickness direction. More specifically, the optical rotatory layer preferably exhibits a so-called chiral nematic phase having a helical structure and a cholesteric phase. The liquid crystal compound will be described in detail later, but as the liquid crystal compound used in the optical rotatory layer, a liquid crystal compound showing a nematic liquid crystalline phase is preferably used. In a case of forming the phase, it is preferable to use a mixture of a liquid crystal compound showing a nematic liquid crystalline phase and a chiral agent (chiral agent) to be described later.

Figure 2:
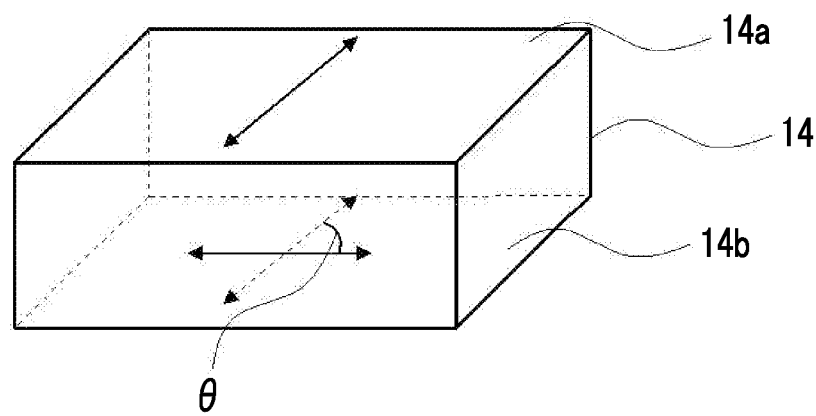
FIG. 2 is a schematic view showing a relationship of in-plane slow axes of an optical rotatory layer.

Next, the positional relationship of the in-plane slow axes in the optical rotatory layer will be described in detail using FIG. 2. The black arrow in the optical rotatory layer shown in FIG. 2 means an in-plane slow axis.

The twisted direction of the liquid crystal compound in the optical rotatory layer is not particularly limited and the liquid crystal compound may be twisted right or left.

Although the twisted angle of the liquid crystal compound in the optical rotatory layer is not particularly limited, in a case where linearly polarized light incident to the optical rotatory layer is rotated by 90° through the brightness enhancement film to be described later, the twisted angle is preferably 85° to 95°. The twisted angle corresponds to an angle θ formed between an in-plane slow axis in one surface 14a and an in-plane slow axis in the other surface 14b of the optical rotatory layer 14 in FIG. 2.

Although a product $\Delta nd$ of an refractive index anisotropy $\Delta n$ of the optical rotatory layer measured at a wavelength of 550 nm and a film thickness d of the optical rotatory layer is not particularly limited, in a case where linearly polarized light incident to the optical rotatory layer is rotated by 90° through the brightness enhancement film to be described later, the product is preferably 450 to 550 nm and more preferably 480 to 500 nm.

The kind of liquid crystal compound to be used to form the optical rotatory layer is not particularly limited. As the optical rotatory layer, for example, a layer obtained by aligning a low-molecular-weight liquid crystal compound in a predetermined direction and then fixing the liquid crystal compound by photocrosslinking or thermal crosslinking, or a layer obtained by aligning a polymer liquid crystal compound in a predetermined direction and then fixing the alignment by cooling can be used.

Generally, liquid crystal compounds can be classified into a rod-like type (rod-like liquid crystal compound) and a discotic type (disk-like liquid crystal compound, discotic liquid crystal compound) according to the shape thereof. Further, each includes low-molecular types and polymer types. The polymer generally refers to a type having a polymerization degree of 100 or more (Polymer Physics-Phase Transition Dynamics), by Masao Doi, p. 2, published by Iwanami Shoten, Publishers, 1992). In the present invention, any type of liquid crystal compound can be used. Two or more types of rod-like liquid crystal compounds, two or more types of disk-like liquid crystal compounds, or a mixture of a rod-like liquid crystal compound and a disk-like liquid crystal compound may be used.

As the rod-like liquid crystal compound, for example, the rod-like liquid crystal compounds described in claim 1 of JP1999-513019A (JP-H11-513019A) or paragraphs [0026] to [0098] of JP2005-289980A are preferably used. As the disk-like liquid crystal compound, for example, the discotic liquid crystal compounds described in paragraphs [0020] to [0067] of JP2007-108732A and paragraphs [0013] to [0108] of JP2010-244038A are preferably used.

Since a change in optical properties due to temperature and/or humidity can be reduced, the optical rotatory layer is more preferably formed by using a liquid crystal compound (rod-like liquid crystal compound or a disk-like liquid crystal compound) having a polymerizable group. The liquid crystal compound may be used in the form of a mixture of two or more kinds thereof and in this case, at least one of the compounds preferably has two or more polymerizable groups.

That is, the optical rotatory layer is preferably a layer formed by fixing a liquid crystal compound having a polymerizable group by polymerization and in this case, the liquid crystal compound does not necessarily exhibit liquid crystallinity after the layer is formed.

The kind of polymerizable group included in the liquid crystal compound is not particularly limited and a functional group that is able to undergo addition polymerization reaction is preferable. Such a polymerizable group is preferably a polymerizable ethylenically unsaturated group or a ring-open polymerizable group. More specifically, a (meth)acryloyl group, a vinyl group, a styryl group, or an allyl group is preferable and a (meth)acryloyl group is more preferable.

(Other Members)

The temporary support with an optical rotatory layer includes at least the above-mentioned temporary support and optical rotatory layer, but may include other members in a range not to damage the effects of the present invention. For example, a known alignment film may be arranged between the temporary support and the optical rotatory layer.

(Procedure of Step 1)

A method for forming an optical rotatory layer on the temporary support is not particularly limited and a known method is adopted.

For example, a method in which a composition including a liquid crystal compound having a polymerizable group is applied to the temporary support, a heating treatment is performed, if necessary, and then a curing treatment is performed on the coating film is preferable.

Hereinafter, this method will be described in detail.

The composition to be used includes the above-mentioned liquid crystal compound having a polymerizable group.

The composition may include components other than the liquid crystal compound, if necessary.

The composition may include a chiral agent.

A chiral agent is added to align the liquid crystal compound in a twisted manner. Of course, in a case where the liquid crystal compound is a compound exhibiting optical activity, such as having asymmetric carbon in the molecule, the use of chiral agent may not be required. Depending on the manufacturing method or twisted angle, the use of chiral agent is also not required.

As the chiral agent, as long as the chiral agent is compatible with the liquid crystal compound to be used in combination, there is no particular limitation on the structure. Any of known chiral agents (for example, described in "Liquid Crystal Device Handbook", Chapter 3, Item 4-3, chiral agents for twisted nematic (TN) and super twisted nematic (STN), p. 199, edited by Japan Society for the Promotion of Science, Committee 142, 1989,) can be used. The chiral agent usually contains an asymmetric carbon atom, but an axial asymmetric compound or a planar asymmetric compound, not containing an asymmetric carbon atom, may also be used as a chiral agent. Examples of the axial asymmetric compound and the planar asymmetric compound include binaphthyl, helicene, paracyclophane and derivatives thereof. In addition, the chiral agent may have liquid crystallinity.

Further, the above-mentioned liquid crystal compound is used in combination with a surfactant, a polymerizable monomer, a polymer, a plasticizer, or the like so that the evenness of the coating film, the strength of the optical rotatory layer, and the alignment of the liquid crystal compound can be improved. It is preferable that these additives have compatible with the liquid crystal compound and the alignment of the liquid crystal compound is not inhibited.

In addition, since the liquid crystal compound is in a horizontal alignment state or in a vertical alignment state, an additive (alignment controlling agent) for promoting horizontal alignment or vertical alignment may be used.

As the surfactant, known compounds may be used and a fluorine-based compound is preferable. Examples thereof include compounds described in paragraphs [0028] to [0056] of JP2001-330725A and compounds described in paragraphs [0069] to [0126] of JP2003-295212A.

As the polymerizable monomer, a radically polymerizable or cationically polymerizable compound may be used. Of these, a polyfunctional radically polymerizable monomer is preferable, and a polymerizable monomer copolymerizable with the above liquid crystal compound having a polymerizable group is preferable. Examples thereof include those described in paragraphs [0018] to [0020] of JP2002-296423A.

It is preferable that the polymer to be used in combination with the liquid crystal compound is capable of thickening the composition. Examples of the polymer include cellulose esters. Preferable examples of cellulose esters include those described in paragraph of JP2000-155216A.

The composition may include a solvent (water or organic solvent). As the solvent, an organic solvent is preferable. Examples of the organic solvent include an amide (such as N,N-dimethylformamide), a sulfoxide (such as dimethylsulfoxide), a heterocyclic compound (such as pyridine), a hydrocarbon (such as benzene, or hexane), an alkyl halide (such as chloroform or dichloromethane), an ester (such as methyl acetate, ethyl acetate, or butyl acetate), a ketone (such as acetone or methyl ethyl ketone), and an ether (such as tetrahydrofuran, or 1,2-dimethoxyethane). Among these, alkyl halides, or ketones are preferable. Also organic solvents of two or more kinds may be used in combination.

The surface of the temporary support may be subjected to a rubbing treatment if necessary. For the rubbing treatment, a treatment method widely adopted as a liquid crystal alignment step of a liquid crystal display (LCD) can be adopted. Generally, the rubbing treatment is carried out by repeating rubbing several times using a cloth in which fibers having uniform length and thickness are implanted on the average or the like.

The composition can be applied to the temporary support by a known method (such as a wire bar coating, an extrusion coating, a direct gravure coating, a reverse gravure coating or a die coating).

The composition is applied to the temporary support, if necessary, a heating treatment is performed on the coating film, and the liquid crystal compound in the coating film is aligned. The conditions for the heating treatment are not particularly limited and appropriate conditions are selected according to the kind of liquid crystal compound to be used.

Thereafter, a curing treatment is performed on the coating film. For the curing treatment, a photocuring treatment or a thermal curing treatment may be used and a photocuring treatment is preferable.

Although the kind of light to be used in a photocuring treatment is not particularly limited, from the viewpoint of curability of the coating film, ultraviolet light is preferable. As the conditions for the photocuring treatment (irradiation dose, time, and the like), appropriate conditions are selected according to the kind of liquid crystal compound.

<Step 2>

Figure 3:
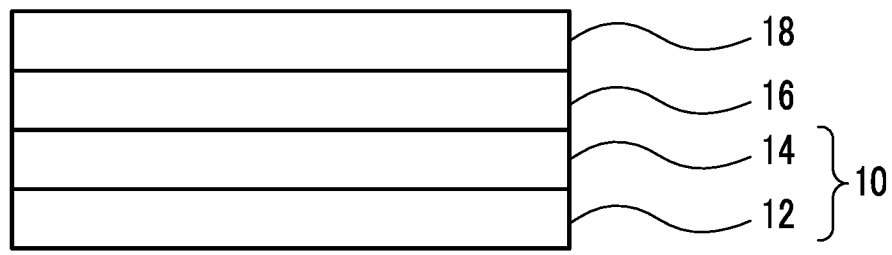
FIG. 3 is a schematic view showing an aspect of Step 2.
Figure 4:
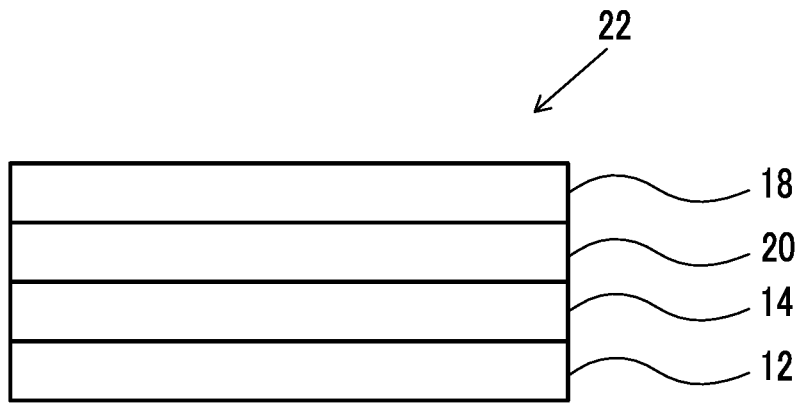
FIG. 4 is a schematic view showing the aspect of Step 2.

Step 2 is a step of bonding the optical rotatory layer of the temporary support with an optical rotatory layer obtained in Step 1 and a polarizer through a curable adhesive layer and then curing the curable adhesive layer to form a first bonding layer having a storage elastic modulus of 2 to 1500 MPa. More specifically, first, as shown in FIG. 3, the optical rotatory layer 14 in the temporary support with an optical rotatory layer 10 and a polarizer 18 are bonded with a curable adhesive layer 16. Next, as shown in FIG. 4, the curable adhesive layer 16 is cured to form a first bonding layer 20. Thus, a first laminate 22 having the temporary support 12, the optical rotatory layer 14, the first bonding layer 20, and the polarizer 18 in this order is obtained.

Hereinafter, first, members used in the step will be described in detail, and then the procedure of the step will be described in detail.

(Polarizer)

The polarizer may be a member having a function of converting natural light into predetermined linearly polarized light and an absorption type polarizer can be adopted.

The kind of polarizer is not particularly limited and a known polarizer can be used. For example, any of an iodine-based polarizer, a dye-based polarizer using a dichroic dye, a polyene-based polarizer, and the like can be used. The iodine-based polarizer and the dye-based polarizer are usually produced by adsorbing iodine or a dichroic dye to polyvinyl alcohol and stretching the polyvinyl alcohol film.

The polarizer may have protective films bonded to both surfaces thereof.

(Curable Adhesive Layer)

The kind of curable adhesive constituting the curable adhesive layer used in the step is not particularly limited as long as the storage elastic modulus of the first bonding layer after curing as described later shows a predetermined value.

As the curable adhesive, an adhesive which is curable by an active energy ray such as ultraviolet light, visible light, an electron beam, or an X-ray, or by heat is preferable and a so-called active energy ray curable adhesive is more preferable.

The curable adhesive is preferably a solvent-free. In the present specification, the term "solvent-free" means that actively, a solvent is not added, and specifically, in a case where the total mass of the curable adhesive is set to 100% by mass, the content of the solvent is 5% by mass or less.

Specific examples of the curable adhesive include a radical polymerizable adhesive containing, as a main component, a radically polymerizable curable component, such as (meth) acrylic compound, and a cationically polymerizable adhesive containing, as a main component, a cationically polymerizable curable component such as an epoxy compound (hereinafter, also referred to as an epoxy compound).

The curable adhesive layer may include components (for example, a polymerization initiator) other than the above-described curable components.

(Procedure of Step 2)

A method for bonding the optical rotatory layer of the temporary support with an optical rotatory layer and the polarizer through the curable adhesive layer is not particularly limited and a known method can be adopted. For example, a method in which a curable adhesive is applied to the surface of the optical rotatory layer to form a curable adhesive layer and then the curable adhesive layer side of the optical rotatory layer is bonded to the polarizer may be used. Pressure may be applied at the time of binding if necessary.

A method for applying a curable adhesive to the surface of the optical rotatory layer or to the polarizer is not particularly limited and a known method is adopted.

In addition, if necessary, the optical rotatory layer and the polarizer may be bonded by a roll-to-roll process.

In addition, in a case where the optical rotatory layer and the polarizer are bonded, it is preferable that the optical rotatory layer and the polarizer are bonded such that the in-plane slow axis of the surface of the optical rotatory layer on the polarizer side and the transmission axis of the polarizer are orthogonal or parallel to each other, and it is more preferable that the optical rotatory layer and the polarizer are bonded such that the in-plane slow axis of the surface of the optical rotatory layer and the transmission axis of the polarizer are orthogonal to each other.

After the optical rotatory layer and the polarizer are bonded, a curing treatment is performed on the curable adhesive layer which is positioned between the optical rotatory layer and the polarizer to form a first bonding layer.

A method for the curing treatment is not particularly limited and a photocuring treatment and a thermal curing treatment may be used. An appropriate method for the curing treatment is selected according to the kind of curable adhesive to be used. As light to be used in a case of a photocuring treatment, ultraviolet light, visible light, an electron beam, and an X-ray may be used.

The storage elastic modulus of the first bonding layer is 2 to 1500 MPa and is more preferably 2 to 100 MPa. In a case where the storage elastic modulus is less than 2 MPa, the appearance properties of a polarizing plate to be manufactured are deteriorated. In a case where the storage elastic modulus is 1500 MPa or more, the cohesive failure of the first bonding layer easily occurs.

As a method for measuring the storage elastic modulus of the first bonding layer, first, a curable adhesive is applied to a peeling poly ethylene terephthalate (PET) film to form a curable adhesive layer. Then, a curing treatment is performed on the curable adhesive layer to cure the curable adhesive, a peeling PET is peeled off from a laminate including the obtained cured layer (first bonding layer), and a measurement sample (thickness: 10 µm) is prepared. The obtained measurement sample is used to measure the storage elastic modulus of the first bonding layer. For measurement, a dynamic viscoelasticity measuring device (DVA-200) manufactured by IT Keisoku Seigyo Co., Ltd. is used. In addition, the measurement is performed under conditions of a frequency of 1 Hz and a temperature of 25° C.

The film thickness of the first bonding layer is not particularly limited, but from the viewpoint that the appearance properties of a polarizing plate to be obtained are further improved, the film thickness is preferably 0.2 to 5 µm and more preferably 0.5 to 3 µm.

<Step 3>

Figure 5:
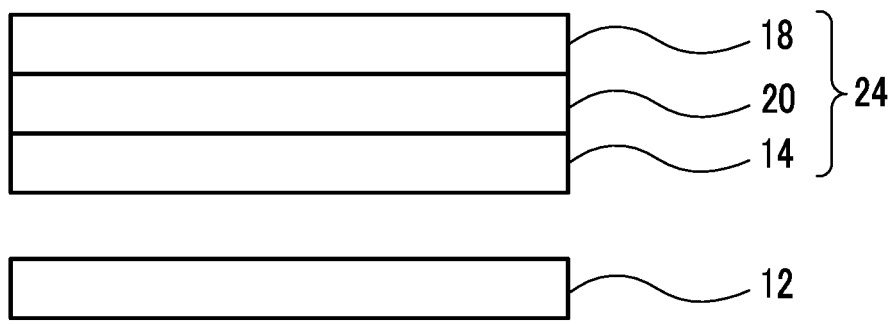
FIG. 5 is a schematic view showing an aspect of Step 3.

Step 3 is a step of peeling off the temporary support from the laminate obtained in step 2. More specifically, as shown in FIG. 5, Step 3 is a step of peeling off the temporary support 12 from the first laminate 22 having the temporary support 12, the optical rotatory layer 14, the first bonding layer 20, and the polarizer 18 in this order obtained in Step 2, and obtaining a second laminate 24 having the optical rotatory layer 14, the first bonding layer 20, and the polarizer 18 in this order.

A method for peeling off the temporary support is not particularly limited and a known method can be adopted. For example, a method in which a pawl is inserted between the temporary support and the optical rotatory layer to provide a chance of peeling, and while the temporary support is being curved and deformed to be away from the optical rotatory layer, both are separated from each other may be used.

<Step 4>

Figure 6:
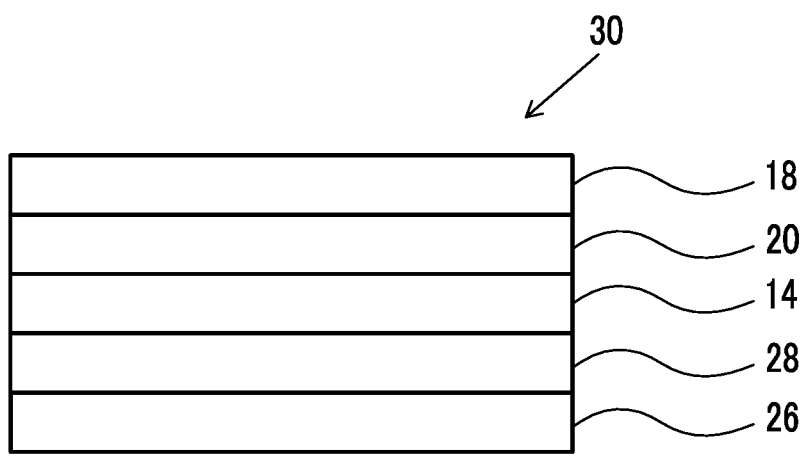
FIG. 6 is a schematic view showing an aspect of Step 4.

Step 4 is a step of bonding the optical rotatory layer of the laminate obtained in Step 3 and a brightness enhancement film through a second bonding layer. More specifically, as shown in FIG. 6, a polarizing plate 30 having a brightness enhancement film 26, a second bonding layer 28, the optical rotatory layer 14, the first bonding layer 20, and the polarizer 18 in this order is obtained by bonding the optical rotatory layer 14 and the brightness enhancement film using the second bonding layer.

In the following, first, the members used in the step will be described in detail, and then the procedure of the step will be described in detail.

(Brightness Enhancement Film)

As the brightness enhancement film, for example, a known diffusing plate, diffusion sheet, prism sheet, or reflective type polarizing film to be described later may be used.

As the prism sheet, a commercially available prism sheet may be used, and for example, a brightness enhancement film BEF manufactured by 3M, and the like are preferably used.

The brightness enhancement film which is a reflective type polarizing film has a function of separating circular polarization or linear polarization, is arranged between the polarizer and a backlight, and backwardly reflects or diffuses either of circularly polarized light or linearly polarized light on the backlight side. Rereflected light from the backlight portion partially changes the state of polarization, and is partially transmitted in a case of being re-incident on the brightness enhancement film and the polarizer. Therefore, the light utilization efficiency is improved and the front brightness is improved to about 1.4 times by repeating this step. An anisotropic reflective type brightness enhancement film and an anisotropic diffusion type brightness enhancement film are known and any of these films can be used in the present invention.

In the anisotropic reflection method, a brightness improvement film is known which has anisotropy of reflectivity and transmittance due to multiple lamination of a monoaxial stretching film and a non-stretched film and increasing a difference in refractive index in stretching directions. For example, multilayer film methods (disclosed in WO95/017691A, WO95/017692A, and WO95/017699A) using a principle of a dielectric mirror. As the multilayer type brightness enhancement film using a principle of a dielectric mirror, DBEF-E, DBEF-D, DBEF-M, and DBEF-P2 (all manufactured by 3M) are preferably used.

In addition, in the present invention, it is also preferable to use an anisotropic diffusion type brightness enhancement film, in which a positive intrinsic birefringence polymer and a negative intrinsic birefringence polymer are blended so as to be monoaxially stretched, and which is disclosed in each of WO97/032223A, WO97/032224A, WO97/032225A, WO97/032226A, JP1997-274108A (JP-H9-274108A), and JP1999-174231A (JP-H11-174231A). As the anisotropic diffusion type brightness enhancement film, DRPF-H (manufactured by 3M) is preferable.

A product of the film thickness (unit: μm) and the tensile elastic modulus (unit: GPa) of the brightness enhancement film is preferably 560 or more, more preferably 1000 to 2100, and even more preferably 1400 to 2100. As long as the product is in the above range, the effects of the present invention is more significantly exhibited.

A method for measuring the tensile elastic modulus of the brightness enhancement film is as follows.

The brightness enhancement film is cut such that the length in a direction orthogonal to the transmission axis is 150 mm and the length in a direction parallel to the transmission axis is 10 mm, and the cut measurement sample is left to stand for 2 hours in an environment at a temperature of 25° C. and a relative humidity of 60%. Thereafter, the measurement sample is stretched using an automatic tensile tester manufactured by Intesco co., ltd., in an environment at a temperature of 25° C. and a relative humidity of 60% with a length of 100 mm between the chucks and a tensile rate of 10%/min, stress at the time of 0.1% elongation and 0.5% elongation is measured, and the tensile elastic modulus is calculated from the slope.

(Second Bonding Layer)

The second bonding layer has a function of bonding the brightness enhancement film and the optical rotatory layer and a known bonding layer can be used. As the second bonding layer, a pressure sensitive adhesive layer and an adhesive layer can be used. The adhesive layer is a layer obtained by curing a curable adhesive layer.

As a material constituting the pressure sensitive adhesive layer and the adhesive layer, known materials can be used.

Although the storage elastic modulus of the second bonding layer is not particularly limited, the storage elastic modulus is 3 MPa or less in many cases. In the range, the storage elastic modulus is preferably 1 MPa or less and more preferably 0.2 to 0.5 MPa. As long as the storage elastic modulus is in the above range, in a case of bonding of the brightness enhancement film, even in a case where lamination unevenness occurs, unevenness can be favorably eliminated by an autoclave treatment.

For measurement of the storage elastic modulus of the second bonding layer, a dynamic viscoelasticity measuring device (DVA-200) manufactured by IT Keisoku Seigyo Co., Ltd. is used. In addition, the measurement is performed at a frequency of 1 Hz and at 25° C.

For the measurement sample used in the measurement, in a case where the second bonding layer is a pressure sensitive adhesive layer, the pressure sensitive adhesive layer is formed in a substantially ball shape to prepare a measurement sample (diameter: about 5 mm) and the prepared sample is used for measurement. In addition, in a case where the second bonding layer is an adhesive layer, a measurement sample is prepared in the same procedure as in the preparation of the measurement sample at the time of measurement of the storage elastic modulus of the first bonding layer.

The haze of the second bonding layer is not particularly limited and is preferably 30% to 80% and more preferably 40% to 70%. As long as the haze of the second bonding layer is in the above range, the effect of the haze of the brightness enhancement film can be adjusted, the brightness unevenness of the obtained polarizing plate can be made favorable, and front brightness is also relatively improved.

The film thickness of the second bonding layer is not particularly limited, but from the viewpoint of further improved handleability of the polarizing plate, the film thickness is preferably 1 to 50 μm and more preferably 10 to 30 μm.

(Procedure of Step 4)

A method for bonding the optical rotatory layer of the laminate obtained in Step 3 and the brightness enhancement film through the second bonding layer is not particularly limited and a known method is used.

In a case where a pressure sensitive adhesive layer is used as the second bonding layer, for example, a method in which the pressure sensitive adhesive layer is arranged on the optical rotatory layer and then the pressure sensitive adhesive layer on the optical rotatory layer and a brightness enhancement film are bonded may be used.

In addition, in a case where an adhesive layer is used as the second bonding layer, for example, a method in which a curable adhesive is applied to the optical rotatory layer, then the curable adhesive layer on the optical rotatory layer and a brightness enhancement film are bonded, and further the curable adhesive layer is subjected to a curing treatment to form an adhesive layer may be used.

If necessary, the optical rotatory layer and the brightness enhancement film may be bonded by a roll-to-roll process.

In a case of using a brightness enhancement film having a transmission axis in a roll transport direction such as DBEF (registered trademark), the optical rotatory layer and the brightness enhancement film are preferably bonded such that the in-plane slow axis of the optical rotatory layer surface on the brightness enhancement film side and the transmission axis of the brightness enhancement film are orthogonal or parallel to each other and more preferably bonded such that the in-plane slow axis of the optical rotatory layer surface and the transmission axis of the brightness enhancement film are orthogonal to each other.

<Polarizing Plate>

Through the above-mentioned procedures, a polarizing plate having the polarizer, the first bonding layer, the optical rotatory layer, the second bonding layer, and the brightness enhancement film in this order is obtained. The first bonding layer exhibits the above-mentioned predetermined storage elastic modulus.

The definition of each layer is as described above.

The polarizing plate may include members other than the above-mentioned members (for example, an alignment film, a support, and the like).

<Applications>

Figure 7:
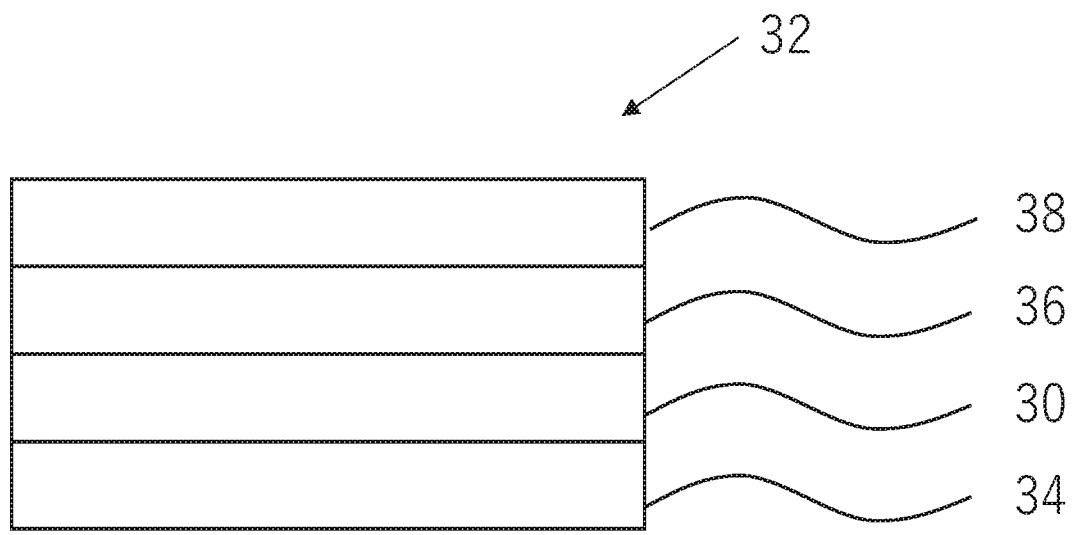
FIG. 7 is a schematic view showing a liquid crystal display device.

The polarizing plate of the embodiment of the present invention can be used for various applications, and among these, the polarizing plate is preferably used as a backlight-side polarizer in a liquid crystal display device. More specifically, as shown in FIG. 7, a liquid crystal display device 32 having a backlight 34, the polarizing plate 30 of the embodiment of the present invention, a liquid crystal cell 36, and a front-side polarizer 38 is exemplified. In this liquid crystal display device, the polarizer of the polarizing plate of the embodiment of the present invention constitutes the backlight-side polarizer.

The polarizing plate of the embodiment of the present invention and the liquid crystal cell may be bonded through a pressure sensitive adhesive layer.

EXAMPLES

Hereinafter, the present invention will be further described in detail based on Examples. Materials, reagents, the amount of substances, the proportion thereof; the contents of treatments, treatment procedures, and the like, which are shown in the following Examples, can be appropriately changed within the scope not departing from the gist of the present invention. Accordingly, the present invention should not be interpreted restrictively by the following Examples.

<Measurement of Storage Elastic Modulus>

In a case where the storage elastic modulus of a pressure sensitive adhesive layer to be described later was measured, first, the pressure sensitive adhesive layer was formed in a substantially ball shape to prepare a measurement sample (diameter: about 5 mm).

In addition, in a case where the storage elastic modulus of an adhesive layer to be described later was measured, first, a curable adhesive was applied to a peeling poly ethylene terephthalate (PET) film to form a curable adhesive layer. Thereafter, the curable adhesive layer was irradiated with ultraviolet light to cure the curable adhesive, and the peeling PET was peeled off from the obtained laminate to prepare a measurement sample (thickness: 10 μm).

The storage elastic modulus of the pressure sensitive adhesive layer or adhesive layer was measured using the measurement sample prepared above, respectively. For measurement, a dynamic viscoelasticity measuring device (DVA-200) manufactured by IT Keisoku Seigyo Co., Ltd. was used. In addition, the measurement was performed at a frequency of 1 Hz at 25° C.

<Measurement of Tensile Elastic Modulus of Brightness Enhancement Film>

The brightness enhancement film was cur such that the length in a direction orthogonal to the transmission axis was 150 mm and the length in a direction parallel to the transmission axis was 10 mm, and the cur measurement sample was left to stand for 2 hours in an environment at a temperature of 25° C. and a relative humidity of 60%. Thereafter, the measurement sample was stretched using an automatic tensile tester manufactured by Intesco co., ltd., in an environment at a temperature of 25° C. and a relative humidity of 60% with a length of 100 mm between the chucks and a tensile rate of 10%/min, stress at the time of 0.1% elongation and 0.5% elongation was measured, and the tensile elastic modulus was calculated from the slope.

<Measurement Method of Haze>

In the present specification, the haze is a value measured in the following procedure based on JIS K-7136 (2000).

First, a layer to be measured (for example, a pressure sensitive adhesive layer) was arranged on optical glass to prepare a measurement sample (sample size: 50 mm×50 mm). Next, the haze of the layer to be measured of the measurement sample (for example, a pressure sensitive adhesive layer) was measured at a temperature of 25° C. and a relative humidity of 55% using a haze meter NDH2000 (manufactured by Nippon Denshoku Industries Co., Ltd.).

<Measurement of Film Thickness of Optical Rotatory Layer>

A transfer film 1 to be described later was cut into a sample size of 50 mm×50 mm to prepare a measurement sample. Next, the obtained measurement sample was measured using a reflective film thickness meter FE3000 (manufactured by Otsuka Electronics Co., Ltd.) and the film thickness of the optical rotatory layer was obtained using device attached analysis software.

<Measurement of Δn and Twisted Angle>

The transfer film 1 to be described later was cut into a sample size 50 mm×50 mm. Next, the optical rotatory layer of the cut transfer film 1 was transferred to the optical glass using commercially available SK2057 to prepare a measurement sample.

The obtained measurement sample was measured using AxoScan OPMF-1 (manufactured by Opto Science, Inc.) and the Δn of the optical rotatory layer and the twisted angle of the liquid crystal compound were obtained using device attached analysis software.

Example 1

(Manufacturing of Peelable Support)

A rubbing treatment was performed on the surface of PET (thickness: 75 μm) manufactured by Fujifilm Corporation to prepare a peelable support.

(Manufacturing of Transfer Film)

A coating solution for an optical rotatory layer (Composition A1) described later was applied to the rubbed surface of the peelable support to have a film thickness of 3 μm using a bar coater to form a coating film. Next, after heat aging for 90 seconds under the condition that the coating film surface temperature was 60° C., the coating film was irradiated with ultraviolet light (300 mJ/cm$^2$) at 100° C. and the alignment of the liquid crystal compound was fixed to form an optical rotatory layer. A laminate including the obtained peelable support and the optical rotatory layer is referred to as a transfer film 1.

The Δn of the obtained optical rotatory layer was 0.16, the film thickness d was 3000 nm, and the Δnd was 480 nm. In addition, the optical rotatory layer included a liquid crystal compound aligned in a twisted manner along a helical axis extending in the thickness direction thereof and the twisted angle of the liquid crystal compound was 90°.

| Coating solution for optical rotatory layer (Composition A1) | |
|---|---|
| Methyl ethyl ketone | 233 parts by mass |
| Cyclohexanone | 12 parts by mass |
| Rod-like liquid crystal compound 201 | 83 parts by mass |
| Rod-like liquid crystal compound 202 | 15 parts by mass |
| Rod-like liquid crystal compound 203 | 2 parts by mass |
| Polyfunctional monomer A-TMMT (manufactured by Shin-Nakamura Chemical Co., Ltd.) | 1 part by mass |
| IRGACURE 819 (manufactured by BASF) | 4 parts by mass |
| Surfactant 1 | 0.05 parts by mass |
| Surfactant 2 | 0.01 parts by mass |
| Chiral agent | 0.115 parts by mass |

Surfactant 2

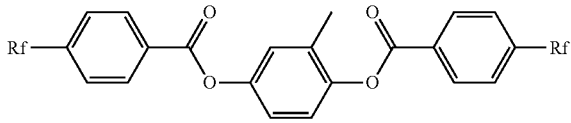

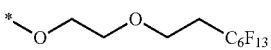

Rod-Like Liquid Crystal Compound 201

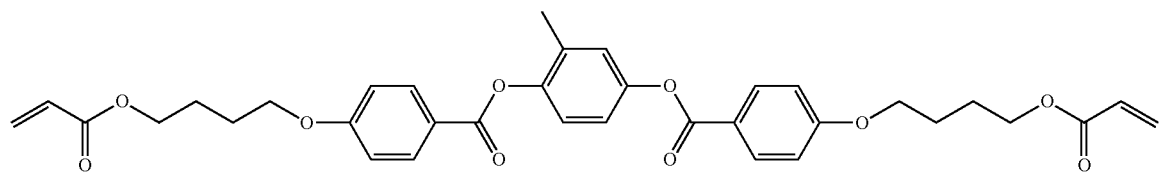 [SMILES: C=CC(=O)OCCCCOc1ccc(C(=O)Oc2ccc(OC(=O)c3ccc(OCCCCOC(=O)C=C)cc3)c(C)c2)cc1]

Rod-Like Liquid Crystal Compound 202

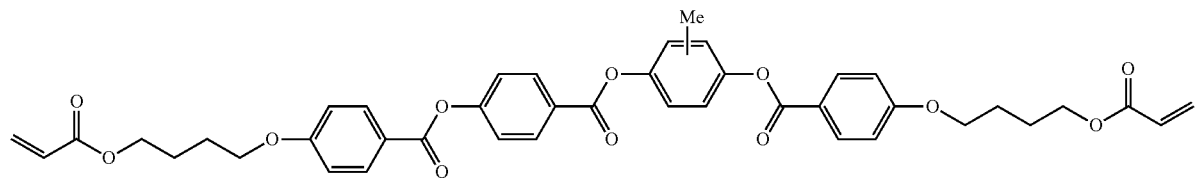

Rod-Like Liquid Crystal Compound 203

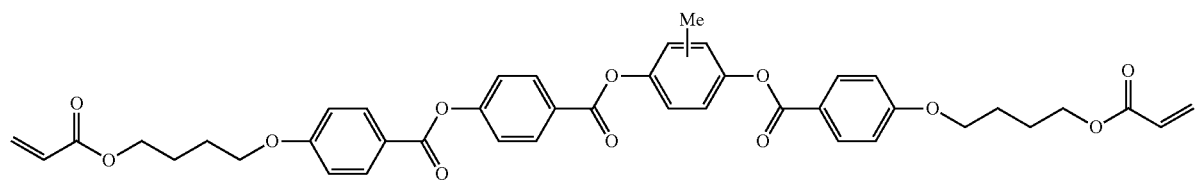

Surfactant 1

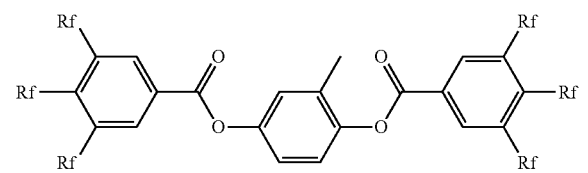

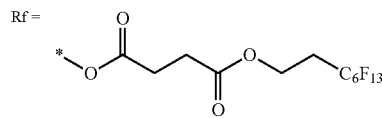

Chiral Agent

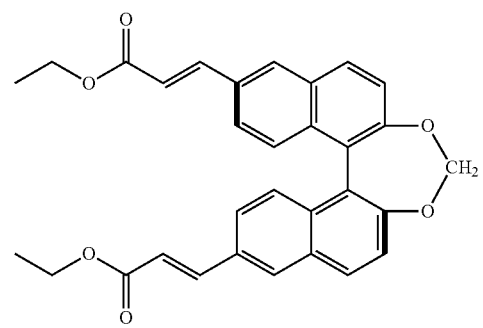

(Preparation of Polarizer)

A polyvinyl alcohol (PVA) film having a thickness of 45 μm was immersed in an aqueous iodine solution (temperature: 30° C.) having an iodine concentration of 0.05% by mass for 60 seconds and the PVA film was dyed.

Next, the dyed PVA film was immersed in an aqueous boric acid solution having a boric acid concentration of 4% by mass for 60 seconds and the PVA film was stretched by 5 times the original length while being immersed. Thereafter, the obtained PVA film was dried at 50° C. for 4 minutes to obtain a polarizer having a thickness of 15 μm. At this time, the stretching direction and the absorption axis direction were parallel to each other.

(Preparation of Laminate)

A saponification treatment to be described later was performed on ZRD40 manufactured by Fujifilm Corporation.

Next, using a curable adhesive (Composition B1), the transfer film 1 was bonded to one surface of the polarizer prepared above and ZRD40 was bonded to the other surface such that the saponified surface was arranged on the polarizer side. In a case where the transfer film 1 was bonded to one surface of the polarizer, the optical rotatory layer of the transfer film 1 became the polarizer side (refer to FIG. 3).

Next, the laminate in which the transfer film 1, the polarizer, and ZRD40 were bonded through the curable adhesive layer was irradiated with ultraviolet light and the curable adhesive layer was cured to form a bonding layer 1 (corresponding to the first bonding layer). Thus, a laminate film 1 was prepared. The film thickness of the bonding layer 1 arranged between the transfer film 1 and the polarizer and between the polarizer and the ZRD40 was 2 μm and the storage elastic modulus at 25° C. was 2 MPa.

| Curable adhesive (Active energy ray-curable adhesive) (Composition B1) | |
|---|---|
| Tripropylene glycol diacerylate | 20 parts by mass |
| ARONIX M-270 | 20 parts by mass |
| 4-hydroxyethyl acrylate | 60 parts by mass |
| KAYACURE DETX-S (radical polymerization initiator, manufactured by Nippon Kayaku Co., Ltd.) | 3 parts by mass |
| IRGACURE 907 (manufactured by BASF) | 3 parts by mass |

(Saponification Treatment)

ZRD40 manufactured by Fujifilm Corporation was allowed to pass through a dielectric heating roll at a temperature of 60° C. and the film surface temperature was increased to 40° C. Thereafter, an alkaline solution having the composition shown below was applied to one surface of the film with a coating amount of 14 ml/m² using a bar coater, and the film coated with the alkaline solution was heated 110° C.

Next, the obtained film was transported for 10 seconds under a steam type far infrared heater manufactured by Noritake Co., Ltd. Subsequently, pure water was applied to the surface of the film with a coating amount of 3 ml/m² using a bar coater similarly. Next, washing with a fountain coater and draining with an air knife were repeatedly performed on the obtained film three times. Thereafter, the film was transported and dried in a drying zone at 70° C. for 10 seconds to prepare a support subjected to alkaline saponification.

| Alkaline solution composition | |
|---|---|
| Potassium hydroxide | 4.7 parts by mass |
| Water | 15.8 parts by mass |
| Isopropanol | 63.7 parts by mass |
| Surfactant: $C_{14}H_{29}O(CH_2CH_2O)_{20}H$ | 1.0 part by mass |
| Propylene glycol | 14.8 parts by mass |

(Preparation of Polarizing Plate)

The peelable support was peeled off from the laminate film 1.

Next, a brightness enhancement film (DBEF, thickness: 255 μm) was bonded to the surface of the optical rotatory layer of the obtained laminate using a commercially available pressure sensitive adhesive SK2057 (manufactured by Soken Chemical & Engineering), by a roll-to-roll (R to R) process, and thus a polarizing plate 1 was prepared. The polarizing plate 1 included the brightness enhancement film, the second bonding layer, the optical rotatory layer, the first bonding layer, the polarizer, the first bonding layer, and ZRD40.

The storage elastic modulus of the pressure sensitive adhesive layer (corresponding to the second bonding layer) positioned between the optical rotatory layer and the brightness enhancement film in the polarizing plate 1 was 0.3 MPa and the haze was 0%. In addition, the film thickness of the pressure sensitive adhesive layer was 20 μm.

The tensile elastic modulus of the brightness enhancement film was 4 GPa, and the product of the film thickness and the tensile elastic modulus of the brightness enhancement film was 1020.

(Preparation of Liquid Crystal Display Device)

A polarizing plate of a commercially available liquid crystal display device (55UF8500 manufactured by LG Electronics.) on a backlight side was separated and the polarizing plate 1 prepared above was bonded thereto using a commercially available pressure sensitive adhesive SK2057 (manufactured by Soken Chemical & Engineering) such that ZRD40 was arranged on the liquid crystal cell side, and an autoclave treatment was performed on the laminate for 30 minutes in an environment at 50° C. and 5 atm to prepare a liquid crystal display device 1.

Example 2

A polarizing plate 2 and a liquid crystal display device 2 were prepared in the same procedure as in Example except that in a case where bonding the polarizer and the optical rotatory layer were bonded, instead of the curable adhesive (Composition B1), a curable adhesive (Composition B2) to be described later was used. The film thickness of the bonding layer 1 arranged between the transfer film and the polarizer and between the polarizer and ZRD40 was 2 μm and the storage elastic modulus at 25° C. was 1450 MPa.

| Curable adhesive (Active energy ray-curable curable adhesive) (Composition B2) | |
|---|---|
| Tripropylene glycol diacerylate | 25 parts by mass |
| Hydroxyethyl acrylamide (manufactured by Kojin Co., Ltd.) | 35 parts by mass |
| Acryloyl morpholine (manufactured by Kojin Co., Ltd.) | 40 parts by mass |
| KAYACURE DETX-S (radical polymerization initiator, manufactured by Nippon Kayaku Co., Ltd.) | 3 parts by mass |
| IRGACURE 907 (manufactured by BASF) | 3 parts by mass |

Example 3

(Preparation of Pressure Sensitive Adhesive)

Into a reactor equipped with a stirrer, a thermometer, a reflux condenser, and a nitrogen introduction pipe, nitrogen gas are introduced, and the air in the reactor was replaced with nitrogen gas. Then, 85 parts by mass of butyl acrylate, 8 parts by mass of benzyl acrylate, 5 parts by mass of benzyl methacrylate, 1 part by mass of 6-hydroxyhexyl acrylate, 8 parts by mass of diethyl acrylamide, and 65 parts by mass of a solvent (ethyl acetate) were added to the reactor. Then, 0.1 parts by mass of azobisisobutyronitrile as a polymerization initiator was added to the reactor and the reaction liquid was allowed to react at 65° C. for 6 hours to obtain an acrylic copolymer solution.

0.2 parts by mass of CORONATE HX (isocyanurate of hexamethylene diisocyanate compound), and 2.5 parts by mass of silica melamine core shell particles (composite particles having a melamine core and a silica shell) (particle diameter: 2 μm, refractive index: 1.65) were added to the acrylic copolymer solution prepared above and stirred and mixed to obtain a pressure sensitive adhesive composition.

Next, the pressure sensitive adhesive composition was applied to a peelable film formed of a PET film coated with silicone resin. Next, the solvent was removed from the coating film by drying the composition at 90° C. and then etching was performed in an environment at 23° C. and 50% RH for 7 days. Thus, a pressure sensitive adhesive sheet 1 (film thickness: 20 μm) with haze properties formed by cross-linking the pressure sensitive adhesive composition was prepared. The storage elastic modulus of the pressure sensitive adhesive sheet 1 was 0.3 MPa and the haze was 40%.

A polarizing plate 3 and a liquid crystal display device 3 were prepared in the same procedure as in Example 1 except that in a case where the optical rotatory layer and the brightness enhancement film were bonded, instead of using the pressure sensitive adhesive SK2057 (manufactured by Soken Chemical & Engineering), the above pressure sensitive adhesive sheet 1 was used.

Example 4

A polarizing plate 4 and a liquid crystal display device 4 were prepared in the same procedure as in Example 1 except that in a case where that optical rotatory layer and the brightness enhancement film were bonded, instead of using a pressure sensitive adhesive SK2057 (manufactured by Soken Chemical & Engineering), the curable adhesive used in a case where the polarizer and the transfer film 1 were bonded in Example 1 was used and the same curing treatment was performed.

Example 5

(Preparation of Pressure Sensitive Adhesive)

A pressure sensitive adhesive sheet 2 was prepared in the same manner as in the above (preparation of the pressure sensitive adhesive sheet 1) except that the amount of silica melamine core shell particle to be added was changed to 5 parts by mass. The storage elastic modulus of the pressure sensitive adhesive sheet 2 was 0.3 MPa and the haze was 85%.

A polarizing plate 5 and a liquid crystal display device 5 were prepared in the same procedure as in Example 1 except that in a case where the optical rotatory layer and the brightness enhancement film were bonded, instead of using the pressure sensitive adhesive SK2057 (manufactured by Soken Chemical & Engineering), the pressure sensitive adhesive sheet 2 was used.

Comparative Example 1

A polarizing plate 6 and a liquid crystal display device 6 were prepared in the same procedure as in Example 1 except that in a case where the polarizer and the transfer film 1 were bonded, instead of the curable adhesive, a commercially available pressure sensitive adhesive SK2057 (manufactured by Soken Chemical & Engineering) was used.

The polarizing plates 1 to 6 and liquid crystal display devices 1 to 6 obtained above was used to perform the following evaluations. The results are collectively shown in Table 1 to be described later.

<Appearance of Polarizing Plate>

The polarizing plates 1 to 6 were visually observed and the appearance was evaluated based on the following evaluation standard.

"A": No wrinkles, bubbles, and unevenness are observed and good appearance with in-plane uniformity is provided.

"B": At least one of wrinkles, bubbles, or unevenness is observed and poor appearance with in-plane non-uniformity is provided.

<Appearance Evaluation of Polarizing Plate after Bonding to Liquid Crystal Cell>

After each of the polarizing plates 1 to 6 was bonded to the liquid crystal cell and was subjected to an autoclave treatment, the polarizing plate was visually observed and the appearance was evaluated based on the following evaluation standard.

"A": No wrinkles, bubbles, and unevenness are observed and good appearance with in-plane uniformity is provided.

"B": At least one of wrinkles, bubbles, or unevenness is observed and poor appearance with in-plane non-uniformity is provided.

<Brightness Unevenness Evaluation>

Each of the prepared liquid crystal display devices was set to display white display (L7) and the brightness unevenness was visually observed in an environment of an illuminance of 100 lx.

"A": The contrast of brightness when viewing the display screen at every angle is not noticeable. "B": The contrast of brightness when viewing the display screen at every angle is slightly noticeable.

<Brightness Evaluation>

Each of the prepared liquid crystal display devices was set to display white display (L7) and the brightness was measured using a measuring instrument (EZ-Contrast XL88, manufactured by ELDIM).

"A": 104% or more with respect to the front brightness of the liquid crystal display device of the product form.

"B": 100% or more and less than 104% with respect to the front brightness of the liquid crystal display device of the product form.

"C": less than 100% with respect to the front brightness of the liquid crystal display device of the product form.

TABLE 1

| | | Example 1 | Example 2 | Example 3 | Example 4 | Example 5 | Comparative Example 1 |
|---|---|---|---|---|---|---|---|
| Polarizing plate constitution | First layer | Polarizer | Polarizer | Polarizer | Polarizer | Polarizer | Polarizer |
| | Second layer | Bonding layer 1 | Bonding layer 1 | Bonding layer 1 | Bonding layer 1 | Bonding layer 1 | Pressure sensitive adhesive layer (SK2057) |
| | Third layer | Optical rotatory layer | Optical rotatory layer | Optical rotatory layer | Optical rotatory layer | Optical rotatory layer | Optical rotatory layer |
| | Fourth layer | Pressure sensitive adhesive layer (SK2057) | Pressure sensitive adhesive layer (SK2057) | Pressure sensitive adhesive sheet 1 | Bonding layer 1 | Pressure sensitive adhesive sheet 2 | Pressure sensitive adhesive layer (SK2057) |
| | Fifth layer | Brightness enhancement film | Brightness enhancement film | Brightness enhancement film | Brightness enhancement film | Brightness enhancement film | Brightness enhancement film |
| Second layer | Storage elastic modulus | 2 MPa | 1450 MPa | 2 MPa | 2 MPa | 2 MPa | 0.3 MPa |
| Fourth layer | Haze | 0% | 0% | 40% | 0% | 85% | 0% |
| | Storage elastic modulus | 0.3 MPa | 0.3 MPa | 0.3 MPa | 2 MPa | 0.3 MPa | 0.3 MPa |
| Evaluation | Appearance of polarizing plate | A | A | A | A | A | B |
| | Appearance evaluation of polarizing plate after bonding to liquid crystal cell | A | A | A | B | A | B |
| | Brightness unevenness | B | B | A | B | A | B |
| | Brightness evaluation | A | A | B | A | C | A |

As shown in Table 1, as shown in Examples 1 to 5, according to a predetermined method for manufacturing a polarizing plate, it was possible to manufacture a polarizing plate exhibiting excellent appearance properties evaluated in (Appearance evaluation of polarizing plate).

On the other hand, in Comparative Example 1 using a bonding layer of which the storage elastic modulus did not satisfy predetermined requirements, desired effects (appearance properties of the polarizing plate) were not obtained.

EXPLANATION OF REFERENCES

10: temporary support with optical rotatory layer
12: temporary support
14: optical rotatory layer
16: curable adhesive layer
18: polarizer
20: first bonding layer
22: first laminate
24: second laminate
26: brightness enhancement film
28: second bonding layer
30: polarizing plate
32: liquid crystal display device
34: backlight
36: liquid crystal cell
38: front-side polarizer

What is claimed is:

1. A method for manufacturing a polarizing plate comprising:
   Step 1 of manufacturing a temporary support with an optical rotatory layer by forming the optical rotatory layer, which has a film thickness of 1 to 10 μm and rotates a polarization axis of linearly polarized light, on the temporary support;
   Step 2 of bonding the optical rotatory layer of the temporary support with an optical rotatory layer and a polarizer through a curable adhesive layer and then curing the curable adhesive layer to form a first bonding layer having a storage elastic modulus of 2 to 1500 MPa;
   Step 3 of peeling off the temporary support from a laminate obtained in Step 2; and
   Step 4 of bonding the optical rotatory layer of the laminate obtained in Step 3 and a brightness enhancement film through a second bonding layer,
   wherein a product of a film thickness and a tensile elastic modulus of the brightness enhancement film is 560 to 2100,
   a unit of the film thickness is μm, and
   a unit of the tensile elastic modulus is GPa.

2. The method for manufacturing a polarizing plate according to claim 1,
   wherein the second bonding layer has a storage elastic modulus of 0.2 to 1 MPa.

3. The method for manufacturing a polarizing plate according to claim 2,
   wherein the optical rotatory layer includes a liquid crystal compound which is aligned in a twisted manner along a helical axis extending in a thickness direction thereof,
   a twisted angle of the liquid crystal compound is 85° to 95°, and
   a product Δnd of a refractive index anisotropy Δn of the optical rotatory layer measured at a wavelength of 550 nm and a film thickness d of the optical rotatory layer is 450 to 550 nm.

4. The method for manufacturing a polarizing plate according to claim 2,
wherein a haze of the second bonding layer is 30% to 80%.

5. The method for manufacturing a polarizing plate according to claim 1,
wherein the optical rotatory layer includes a liquid crystal compound which is aligned in a twisted manner along a helical axis extending in a thickness direction thereof,
a twisted angle of the liquid crystal compound is 85° to 95°, and
a product Δnd of a refractive index anisotropy Δn of the optical rotatory layer measured at a wavelength of 550 nm and a film thickness d of the optical rotatory layer is 450 to 550 nm.

6. The method for manufacturing a polarizing plate according to claim 5,
wherein a haze of the second bonding layer is 30% to 80%.

7. The method for manufacturing a polarizing plate according to claim 1,
wherein a haze of the second bonding layer is 30% to 80%.

8. A polarizing plate comprising, in order:
a polarizer;
a first bonding layer;
an optical rotatory layer which rotates a polarization axis of linearly polarized light;
a second bonding layer; and
a brightness enhancement film,
wherein a film thickness of the optical rotatory layer is 1 to 10 μm, and
the first bonding layer has a storage elastic modulus of 2 to 1500 MPa,
wherein a product of a film thickness and a tensile elastic modulus of the brightness enhancement film is 560 to 2100,
a unit of the film thickness is μm, and
a unit of the tensile elastic modulus is GPa.

9. The polarizing plate according to claim 8,
wherein the second bonding layer has a storage elastic modulus of 0.2 to 1 MPa.

10. The polarizing plate according to claim 9,
wherein the optical rotatory layer includes a liquid crystal compound which is aligned in a twisted manner along a helical axis extending in a thickness direction thereof,
a twisted angle of the liquid crystal compound is 85° to 95°, and
a product Δnd of a refractive index anisotropy Δn of the optical rotatory layer measured at a wavelength of 550 nm and a film thickness d of the optical rotatory layer is 450 to 550 nm.

11. The polarizing plate according to claim 9,
wherein a haze of the second bonding layer is 30% to 80%.

12. The polarizing plate according to claim 8,
wherein the optical rotatory layer includes a liquid crystal compound which is aligned in a twisted manner along a helical axis extending in a thickness direction thereof,
a twisted angle of the liquid crystal compound is 85° to 95°, and
a product Δnd of a refractive index anisotropy Δn of the optical rotatory layer measured at a wavelength of 550 nm and a film thickness d of the optical rotatory layer is 450 to 550 nm.

13. The polarizing plate according to claim 12,
wherein a haze of the second bonding layer is 30% to 80%.

14. The polarizing plate according to claim 8,
wherein a haze of the second bonding layer is 30% to 80%.

15. A liquid crystal display device comprising:
a backlight;
the polarizing plate according to claim 8;
a liquid crystal cell; and
a front-side polarizer.

* * * * *